Oct. 13, 1970     L. S. CUTLER     3,534,292

FREQUENCY STABILIZED LASER SYSTEM

Filed Aug. 2, 1967

INVENTOR
LEONARD S. CUTLER
BY Roland D. Griffin
ATTORNEY

United States Patent Office 3,534,292
Patented Oct. 13, 1970

3,534,292
FREQUENCY STABILIZED LASER SYSTEM
Leonard S. Cutler, Los Altos Hills, Calif., assignor to Hewlett-Packard Company, Palo Alto, Calif., a corporation of California
Filed Aug. 2, 1967, Ser. No. 657,857
Int. Cl. H01s 3/10
U.S. Cl. 331—94.5       8 Claims

ABSTRACT OF THE DISCLOSURE

The cavity of a two frequency Zeeman-split laser is modulated in length by a piezoelectric element to produce a modulated difference frequency. A frequency discriminator converts this modulated difference frequency into a signal having both AC and DC components. The AC component is detected by a synchronous detector driven in synchronism with the piezoelectric element, and the detector output is fed back to the piezoelectric element to control the cavity length of the laser. The DC component is fed back to the laser to control the magnetic field applied to the laser.

Background and summary of the invention

Typically, stabilized two frequency laser systems employ a rotating polarizer and a detector driven in synchronism to produce an AC intensity difference signal that is used to control the cavity length of the laser. A major disadvantage of these intensity stabilized systems is that the rotating polarizer is driven by a motor. Moreover, there is no convenient control signal available for controlling the magnetic field of a Zeeman-split laser.

Accordingly, it is the principal object of this invention to provide a two frequency Zeeman-split laser that is stabilized to the center of the unshifted line of the laser medium and that does not have the above-mentioned disadvantages of intensity stabilized laser systems.

This object is accomplished according to the illustrated embodiment of this invention by detecting the modulated difference frequency of a two frequency Zeeman-split laser and by employing an AC signal component derived from this modulated difference frequency to control the cavity length of the laser. A DC signal component derived from this modulated difference frequency is employed to control the magnetic field applied to the laser.

Description of the preferred embodiment

Figure 1:
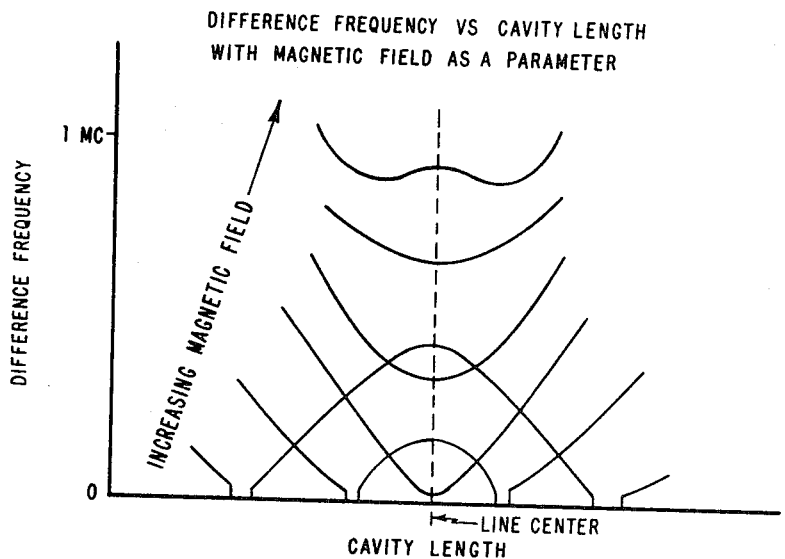
FIG. 1 is a graph of the difference frequency versus cavity length of a Zeeman-split, internal cavity, 6328 A., He–Ne, two frequency laser for increasing magnetic fields.

Referring to the frequency difference versus cavity length curves of FIG. 1, there is a zero beat wherever these curves reach the horizontal (cavity length) axis. For small magnetic fields on the order of 10 gauss, there are two zero beats with a small region of locking around them. The difference frequency then rises to a maximum at the center of the non-Zeeman shifted line. For larger fields, the zero beats move closer together and eventually coalesce and disappear. There is then a single minimum at the line center. For sufficient large fields, the difference frequency again has a maximum at the line center with a minimum on either side. These characteristics of the frequency difference versus cavity length curves differ in some details in actual practice due to asymmetry at high magnetic fields and differences in cavity Q. However, experimentally obtained results agree well with predictions based on the curves of FIG. 1.

Figure 2:
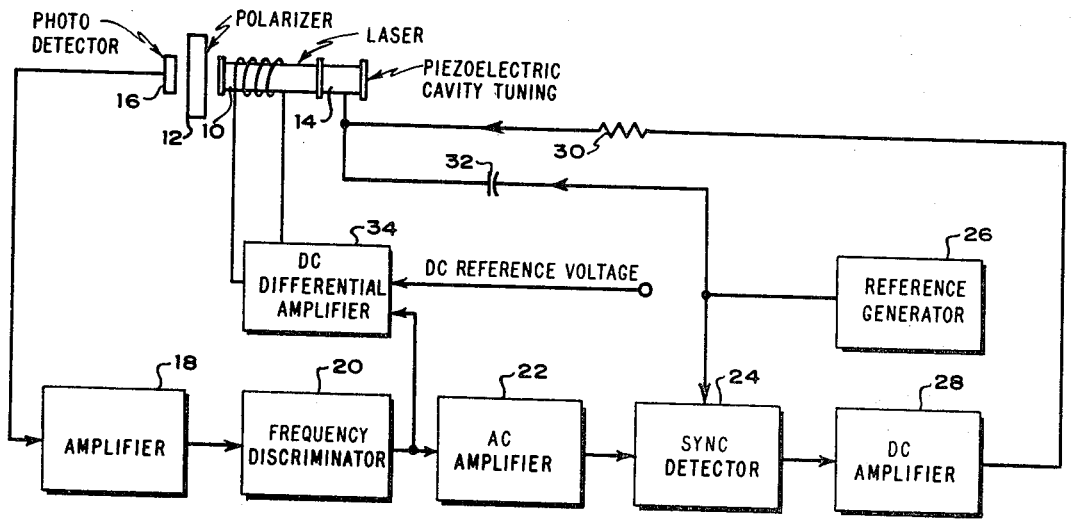
FIG. 2 is a schematic-block diagram of a two frequency Zeeman-split laser that is stabilized according to the preferred embodiment of this invention.

Referring now to FIG. 2, apparatus is shown employing either the minimum or the maximum of one of the frequency difference curves of FIG. 1 to stabilize a two frequency Zeeman-split laser 10 at the line center of the laser medium. The right and left circularly polarized components of the laser output beam are passed through a linear polarizer 12 to make the common linearly polarized components interfere and produce the difference frequency. A piezoelectric mirror mount 14 modulates the cavity length of the laser 10 so that the difference frequency is frequency modulated with characteristics determined by the average cavity length and the magnetic field applied along the direction of the cavity of the laser 10. The modulated frequency difference signal is detected by a photo detector 16, amplified by an amplifier 18, and then supplied to a frequency discriminator 20. In the frequency discriminator 20, the modulated frequency difference signal is converted to a signal having an AC component due to the frequency modulation and a DC component. The AC component is amplified by an AC amplifier 22 and is then detected by a synchronous detector 24. This synchronous detector 24 is driven in synchronism with the piezoelectric mirror mount 14 by a reference pulse generator 26. The output of the synchronous detector 24 is amplified by a DC amplifier 28 and fed back to the piezoelectric mirror mount 14 via blocking resistor 30 to control the cavity length of the laser 10. This blocking resistor 30 prevents AC signal from the reference generator 26 from entering the DC signal path including resistor 30. A blocking capacitor 32 is employed to prevent DC signal from entering the AC signal path connecting the reference generator 26 to the piezoelectric mirror mount 14 and to the synchronous detector 24.

The AC component at the output of the frequency discriminator 20 has a fundamental of one phase when the cavity length is tuned to the left of line center in FIG. 1 and a fundamental of opposite phase when the cavity length is tuned to the right of line center. It has only a second harmonic component when the cavity length is tuned to line center. Thus, by including an appropriate phase shift circuit either in the AC amplifier 22 or in the path between the reference generator 26 and the synchronous detector 24 the output of the synchronous detector is made to vary as required to stabilize the laser 10 at the line center of the laser medium. The DC component at the output of the frequency discriminator 20 is applied to one input of a DC differential amplifier 34, amplified by the amplifier 34, and fed back to the laser 10 for controlling the magnetic field applied to the laser. This stabilizes the difference frequency at the line center of the laser medium to the value for which a voltage equal to a DC reference voltage supplied to the other input of the DC differential amplifier 34 is generated at the output of the frequency discriminator 20.

I claim:
1. A two frequency laser system comprising:
   a Zeeman-split laser including a cavity and first means for applying a magnetic field to the laser to produce an output beam having two components of different frequency, the difference in frequency between said components of the output beam being dependent on cavity length;
   said laser further including second means for modulating the length of said cavity and thereby modulating the difference in frequency between said components of the output beam;
   third means positioned in the path of the output beam for producing a difference frequency signal having a frequency equal to the difference in frequency between said components of the output beam;

a frequency discriminator connected to said third means for converting said difference frequency signal to a signal having an AC component;

fourth means connected to said frequency discriminator for detecting said AC component in synchronism with modulation of the cavity length of said laser to produce a control signal; and fifth means connected to said fourth means for supplying said control signal to said second means to control the cavity length of said laser.

2. A two frequency laser system as in claim 1 wherein:

said frequency discriminator is connected to said third means for converting said difference frequency signal to a signal having a DC component as well as an AC component; and said system includes sixth means connected between said frequency discriminator and said first means and responsive to said DC component for controlling the magnetic field applied to said laser by said first means.

3. A two frequency laser system as in claim 2 wherein said sixth means comprises:

a source of reference voltage;

a DC differential amplifier having one input connected to said source of reference voltage, another input connected to said frequency discriminator, and an output connected to said first means.

4. A two frequency laser system as in claim 3 wherein said third means comprises:

a polarizer for linearly polarizing said components of the output beam; and a photo detector responsive to the linearly polarized components of the output beam for producing said difference frequency signal.

5. A two frequency laser system as in claim 4 wherein:

said second means includes a piezoelectric tuning element;

said fourth means includes a synchronous detector; and said second and fourth means include signal generating means for driving said piezoelectric tuning element and said synchronous detector in synchronism.

6. A two frequency laser system as in claim 5 wherein:

said fourth means further includes an AC amplifier connected between said frequency discriminator and said synchronous detector;

said control signal is a DC control signal; and said fifth means includes a DC amplifier connected between said synchronous detector and said piezoelectric tuning element.

7. A two frequency laser system as in claim 6 wherein:

said second means further includes a DC signal blocking capacitor connected between said signal generating means and said piezoelectric tuning element; and said fifth means further includes an AC signal blocking resistor connected between said piezoelectric tuning element and the DC amplifier of said fifth means.

8. A two frequency laser system as in claim 7 wherein said signal generating means comprises a reference signal generator connected to said piezoelectric tuning element and to said synchronous detector.

References Cited

UNITED STATES PATENTS 3,170,122  2/1965  Bennett _____ 331—94.5

OTHER REFERENCES

McDermott, Transmitters and Receivers for Optical Communications. Space/Aeronautics, vol. 39 (June 1963), pp. 98–106.

WILLIAM L. SIKES, Primary Examiner

U.S. Cl. X.R.

356—106